United States Patent
Yamamoto et al.

(10) Patent No.: US 9,197,044 B2
(45) Date of Patent: Nov. 24, 2015

(54) WIRE HARNESS WITH CLIP AND WIRE HARNESS HAVING THE SAME

(71) Applicant: Yazaki Corporation, Tokyo (JP)

(72) Inventors: Masataka Yamamoto, Kosai (JP); Kunihiko Sato, Kosai (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/286,174

(22) Filed: May 23, 2014

(65) Prior Publication Data

US 2014/0251683 A1    Sep. 11, 2014

Related U.S. Application Data

(63) Continuation of application No. PCT/JP2012/007470, filed on Nov. 21, 2012.

(30) Foreign Application Priority Data

Nov. 25, 2011    (JP) .................................. 2011-257398

(51) Int. Cl.
*H02G 3/04*    (2006.01)
*B60R 16/02*    (2006.01)

(52) U.S. Cl.
CPC .......... *H02G 3/0406* (2013.01); *B60R 16/0215* (2013.01)

(58) Field of Classification Search
USPC .............................................. 174/68.3, 72 A
See application file for complete search history.

(56) References Cited

U.S. PATENT DOCUMENTS

| 2,933,550 | A | * | 4/1960 | Judson et al. ..................... 174/76 |
| 3,776,495 | A | | 12/1973 | Hartz et al. |
| 4,874,908 | A | * | 10/1989 | Johansson .................... 174/72 A |
| 5,845,883 | A | * | 12/1998 | Meyer .............................. 248/73 |
| 5,906,342 | A | * | 5/1999 | Kraus .......................... 248/74.1 |

FOREIGN PATENT DOCUMENTS

| JP | 11-205943 A | 7/1999 |
| JP | 2002-093518 A | 3/2002 |
| JP | 2002-315164 A | 10/2002 |
| JP | 2005-026178 A | 1/2005 |
| JP | 2006-014569 A | 1/2006 |

OTHER PUBLICATIONS

International Search Report and Written Opinion mailed Feb. 26, 2013, issued for PCT/JP2012/007470.

* cited by examiner

*Primary Examiner* — Timothy Thompson
*Assistant Examiner* — Michael F McAllister
(74) *Attorney, Agent, or Firm* — Locke Lord LLP

(57) ABSTRACT

There is provided a wire harness with clip in which a clip for fixing a protect tube without winding tape is integrally molded, and a wire harness having the wire harness with clip. The wire harness with clip is provided with a clip to be latched into an attaching hole of a panel, molded integral with an electric wire. The clip includes a main body, a latch part upstanding from a lower face of the main body and is latched into the attaching hole, and an electric wire fixing part disposed on an upper face of the main body and integrally molded on an outer periphery of the electric wire so as to fix the electric wire, the electric wire fixing part including an engaging projection engaging with an inner periphery of a protect tube passing the electric wire therethrough and protecting the electric wire, and a restriction part.

7 Claims, 2 Drawing Sheets

WIRE HARNESS WITH CLIP AND WIRE HARNESS HAVING THE SAME

TECHNICAL FIELD

This invention relates to a wire harness with clip in which a clip configured to be latched into an attaching hole of a panel is molded integral with an electric wire, and a wire harness having the wire harness with clip.

BACKGROUND ART

In an automobile various electric devices are mounted. As means for transferring electric power or control signals from a power source such as a battery to these electric devices, a wire harness is employed. As such the wire harness there has been advocated what is provided with an electric wire for transferring electric power or control signal, and a clip latched into a attaching hole of a panel composing a car body of such the automobile (i.e., see PTLs 1 or 3). Also, there has been advocated what includes the electric wire provided with a protect tube protecting the electric wire (i.e., see PTLs 4 or 5).

CITATION LIST

Patent Literature

[PTL 1]
Japanese Patent Application Laid-Open Publication No. 2006-014,569
[PTL 2]
Japanese Patent Application Laid-Open Publication No. 2005-026,178
[PTL 3]
Japanese Patent Application Laid-Open Publication No. 2002-315,164.
[PTL 4]
Japanese Patent Application Laid-Open Publication No. H11-205,943.
[PTL 5]
Japanese Patent Application Laid-Open Publication No. 2002-093,518

SUMMARY OF INVENTION

Technical Problem

Disadvantageously, in such the conventional wire harness shown in the aforementioned PTLs 1 to 5, when providing a protect tube in the electric wire, adherence tape is wound on an end of the protect tube to be fixed to such a clip. Thereby work for winding adherence tape on the end of the protect tube takes so trouble as to take a prolonged time to manufacture the wire harness.

Furthermore, the aforementioned conventional wire harness requires work for winding the adherence tape on the end of the protect tube, inducing drawback that manufacturing cost for the wire harness increases.

Accordingly, an object of the present invention is to resolve the concerned problem. Namely, the present invention, in order to shorten working time for manufacturing the wire harness as well as reduce manufacturing cost therefor, provides a wire harness with clip in which a clip for fixing the protect tube is molded integral with an electric wire, and a wire harness having the wire harness with clip.

Solution to Problem

In order to resolve the problem and to attain the object, according to a first aspect of the invention, there is provided a wire harness with clip comprising: a clip configured to be latched into an attaching hole of a panel, molded integral with an electric wire, the clip including a main body, a latch part upstanding from a lower face of the main body, and is latched into the attaching hole, and an electric wire fixing part disposed on an upper face of the main body, integrally molded on an outer periphery of the electric wire so as to fix the electric wire, the electric wire fixing part including an engaging projection engaging with an inner periphery of a protect tube, the protect tube passing the electric wire therethrough and protecting the electric wire, a restriction part restricting the protect tube from entering into the electric wire fixing part.

Preferably, the second restriction part is disposed at one end of the main body, and wherein the restriction part is arranged continuous with an edge end of the second restriction part.

Preferably, the second restriction part is disposed at one end of the main body, and wherein the restriction part is arranged continuous with an edge end of the second restriction part.

According to a second aspect of the invention, there is provided a wire harness, comprising: a wire harness with clip, including a connector disposed at at least one end of an electric wire, a protect tube passing the electric wire therethrough and protecting the electric wire, and a clip configured to be latched into an attaching hole of a panel, and molded integral with the electric wire, wherein the wire harness with clip is that related to the first aspect of the invention.

Advantageous Effects of Invention

According to the invention of the first aspect, since in the wire harness with clip the electric wire fixing part is provided with the engaging projection engaging with the inner periphery of the protect tube, and the restriction part restricting the protect tube from entering, it is made possible to fix the protect tube to the electric wire fixing part as well as restrict the protect tube from entering into the electric wire fixing part. Thereby work for winding tape to fix the protect tube to the clip is eliminated, as well as entering of the protect tube is made restricted.

Therefore, it is made possible to shorten time required for manufacturing the wire harness with clip as well as to reduce manufacturing cost of the wire harness with clip, and to prevent the protect tube and the latch part from interfering with each other resulting from the protect tube excessively entering.

According to the invention, since the wire harness with clip is provided with the second restriction part restricting the protect tube from entering into the electric wire fixing part, it is made possible to restrict the protect tube from entering into the electric wire fixing part by the second restriction part and the restriction part of the main body. It is thereby possible to securely restrict the protect tube from entering, securely preventing the protect tube and the latch part from interfering with each other.

According to the invention, since the wire harness with clip is provided with the second restriction part at the one end of the main body as well as restriction part of the electric wire fixing part continuous with the second restriction part, it is made possible to restrict the protect tube from entering into the electric wire fixing part by the one end of the main body. Therefore, it is made possible to force the restriction part and the second restriction part away form the latch part, further securely preventing the protect tube and the latch part from interfering with each other.

According to the second aspect of the invention, the wire harness is provided with the wire harness with clip of the first aspect, winding the tape to fix the protect tube to the clip with such adherence tape is made eliminated. Therefore, it is made possible to shorten working time for manufacturing the wire harness as well as reduce manufacturing cost therefor.

DESCRIPTION OF EMBODIMENTS

Hereinafter, embodiments of the present invention will be discussed with reference to FIGS. 1 to 4.

Figure 1:
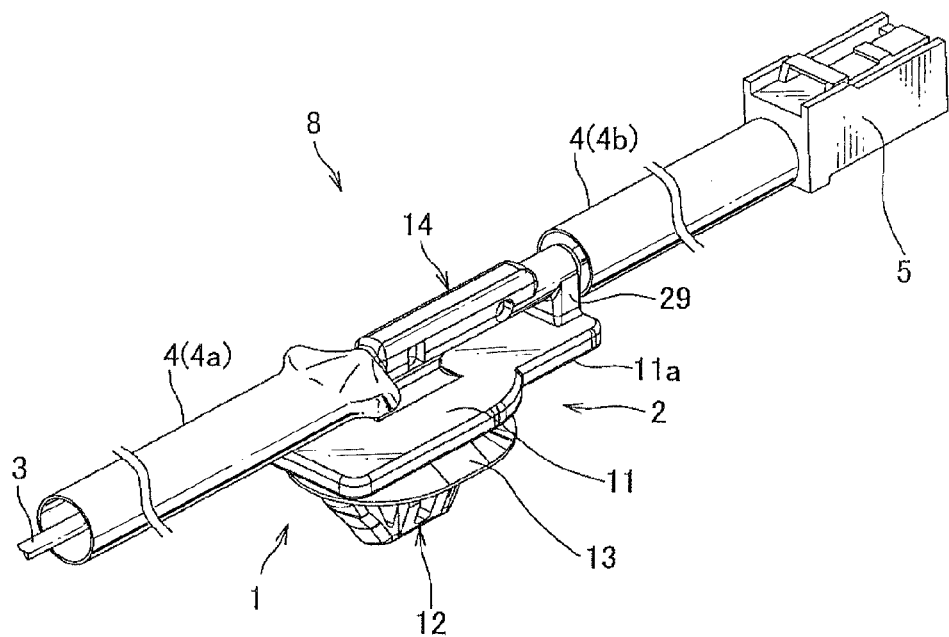
FIG. 1 is a perspective view illustrating a wire harness according to one embodiment of the present invention.

As shown in FIG. 1, a wire harness 8 relevant to one embodiment of the present invention is provided with a protect tube 4 protecting an electric wire 3 composing a wire harness with clip 1, as well as a connector 5 at an end of the electric wire 3.

The protect tube 4 is formed of synthetic resin having flexibility and elasticity, and formed into a tube-like shape. The protect tube 4 is formed having nearly the same length as a distance between an aforementioned connector 5 and a main body 11. The protect tube 4 is provided with one protect tube 4b disposed on the electric wire 3 at its connector 5 side and the other protect tube 4a disposed on the electric wire 3 at the other end side.

The one Protector tube 4b and the other protect tube 4a are formed by cutting the same protect tube 4. An inner diameter of the one protector tube 4b and the other protector tube 4a is formed larger than that of a tube part of an after-mentioned electric wire fixing part 14, as well as formed smaller than that a engaging projection 21 of an electric wire fixing part 14.

This makes, when the other protect tube 4a being inserted into the electric wire fixing part 14, an end of the other protect tube 4a enter into the electric wire fixing tube 14, as well as an end of the other protect tube 4a is elongated to engage with the engaging projection 21. Note that as the protect tube 4 is used what is like a tube which can protect the electric wire 3 such as a corrugated tube formed such that recessed grooves are repeatedly disposed at certain intervals in a longitudinal direction of the protect tube 4.

The connector 5 is disposed at one end of the electric wire 3. The connector 5 is provide with a terminal fitting formed so as to swage a core wire of an end of the electric wire 3, a connector housing engaged with the terminal fitting to be fixed, which is formed connectable with other connector. Note that as the connector 5 is used various connectors such as rely connector.

Figure 2:
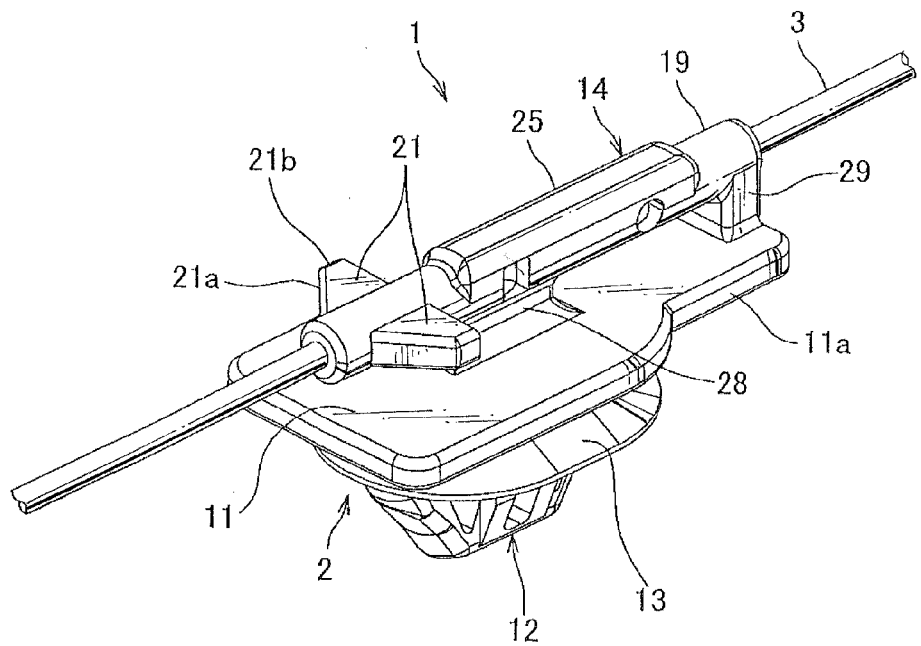
FIG. 2 is a perspective view for explaining the wire harness with clip according to the one embodiment of the present invention.

The wire harness with clip 1 is, as shown in FIG. 2, provided with one electric wire 3, and a clip 2 molded integral with the electric wire 3 and latched into a not-shown attaching hole of a panel.

Figure 3:
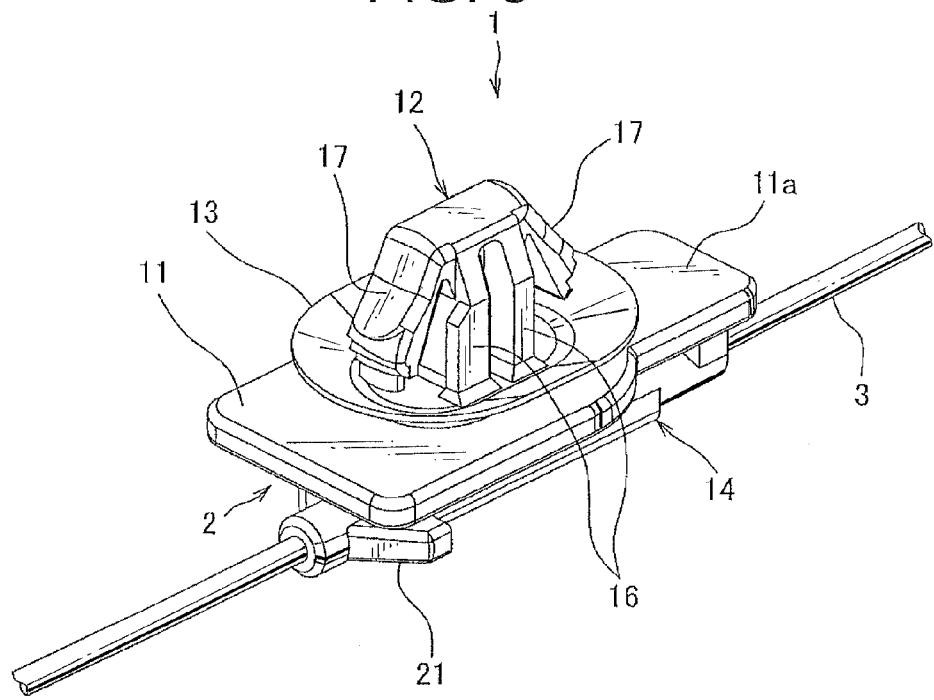
FIG. 3 is a perspective view illustrating a latch part side of the wire harness with clip.
Figure 4:
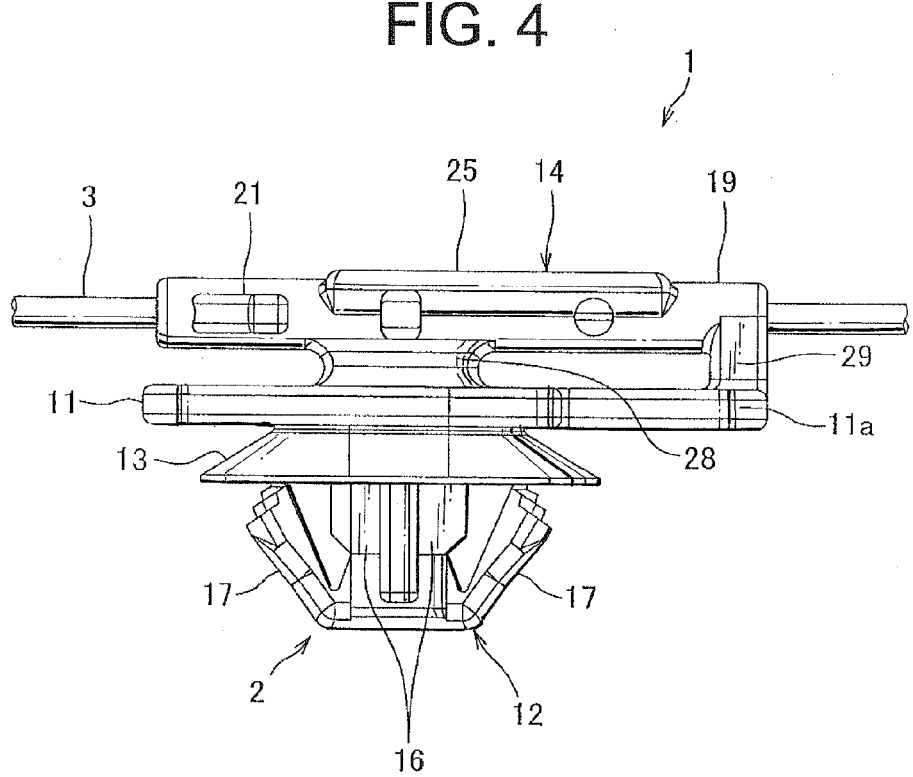
FIG. 4 is a side view illustrating a side of the wire harness with clip.

The electric wire 3 is provided with a conductive core wire, and an insulating cover. The core wire is formed such that a plurality of conductive metal wires is braided. The cover covers the core wire, which is formed of well-insulating synthetic resin. Note that the core wire may be formed in one core wire, The clip 2 is, as shown in FIGS. 2 to 4, provided with a main body 11, a latch part 12 that upstands from the main body 11 and is latched into the aforementioned attaching hole of the panel, a press part 13 that is disposed at an end base of the latch part 12 and presses the panel, and an electric wire fixing part 14 disposed on an upper face of the main body 11 to fix the electric wire 3. The clip 2 is formed of flexible synthetic resin.

The main body 11 is thin-plate-like rectangle-shaped. At one end of the main body 11 is disposed a second restriction part 11a that restricts the protect tube 4 from entering into the electric wire fixing part 14. The main part 11 is formed nearly as large as an outside of the aforementioned press part 13. The press part 13 and the aforementioned latch part 12 are thereby protected by the main body 11, preventing the press part 13 and the latch part 12 from being breaking.

The second restriction part 11a is formed extending from one end of the main body 11 in a longitudinal direction of the electric wire 3. The second restriction part 11a is, as shown in FIG. 1, formed such that its width in a direction intersecting the longitudinal direction of the electric wire 3 is arranged larger than an outer diameter of the protect tube 4.

The one protect tube 4b disposed at the electric wire 3 of the connector 5 side is thereby stuck among the connector 5, the restriction part 29, and the second restriction part 11a of the electric wire fixing part 14 to be held. Therefore, winding adherence tape onto the connector 5 and the one protect tube 4b to fix is made eliminated, resulting in elimination of need of winding adherence tape onto the second restriction part 11a and the one protect tube 4b. This makes work for winding tape saved, as well as work time shortened.

The latch part 12 is as shown in FIGS. 3 and 4, provided with a columnar part 16 that upstands from a lower face of the main body 11, and latch pieces 17 extending from a tip of the cylinder part 16 toward a base end of the cylinder part 16.

The columnar part 16 upstands from the lower face of the main body 11. The columnar part 16 is composed of two columnar parts 16, 16' that are each formed broad in a direction perpendicular to the longitudinal direction of the electric wire 3, and upstand parallel to each other. The columnar part 16 is formed such that its tip side is tapered and its base end side is broadened.

The latch piece 17 is formed slanted in a direction separating from each other toward its free end, and movable nearly in a direction parallel to each approaching. At the free end of the latch piece is disposed an engaging step that engages with an inner periphery of the attaching hole of the panel and a peripheral edge of the attaching hole. The engaging step is formed such that a part thereof to engage with the periphery of the attaching hole is so circular arc-shaped as to draw a circular along the inner periphery.

The press part 13 is disposed at the base end of the columnar part 16. The press part 13 is widened in an ellipsoidal shape, as well as formed slightly slanted toward the tip side of the columnar part 16. The press part 13 is, when the latch part 12 is latched into the attaching hole of the panel, extended toward the tip side of the columnar part 16 so as to press the panel.

The electric wire fixing par 14 is, as shown in FIGS. 2 to 5, provided with a tube part 19 molded integral with an outer periphery of the electric wire 3 into tubular shape, an engaging projection 21 projecting from an outer periphery of the tubular part 19, a pressed part 25 that is pressed toward the attaching hole when the clip 2 is attached to the attaching hole of the panel, and a restriction part 29 restricting the one protect tube 4b, as the protect tube 4, from entering. The electric wire fixing part 14 is connected with the main body 11 through a connection part 28 disposed on the upper face of the main body 11.

The tubular part 19 is disposed on the outer periphery of the electric wire 3 to fix the electric wire 3. The tubular part 19 is integrally molded on the outer periphery of the electric wire 3 and formed into a tubular shape. The tubular part 19 is disposed across nearly entire length of the main body 11 in its longitudinal direction. The tubular part 19 is formed smaller than an inner diameter of the protect tube 4.

The attaching projection 21 is disposed the other end side of the tubular part 19 relative to the aforementioned restriction part 29 disposed at one end of the tubular part 19. The attaching projection 21 is disposed projecting from the outer periphery of the tubular part 19, as well as in a pair of attaching projections 21, 21 each projecting in a direction opposite to each other.

The pair of engaging projections 21 is formed each projecting in a direction nearly parallel to a plane of the main body 11. The pair of engaging projections 21 is provided with a slide face 21a so projecting as to decrease its projection area toward a tip of the other side of the tubular part 19 and having an inner periphery of the protect tube 4 slide, and an engaging face 21b fully projecting and having the inner periphery of the protect tube 4 slide.

Press fitting resistance of the other protect tube 4a entering from the other end of the electric wire fixing part 14 is thereby reduced, and escape resistance of the other protect tube 4a being pulled out from the other end of the electric wire fixing part 14. Therefore, it is made possible to readily fix the other protect tube 4a to the clip 2, eliminating the need of winding tape such as adherence tape.

The pressed part 25 has the upper portion of the electric wire fixing part 14 bulged and formed flat. The pressed part 25 is disposed in a middle of the electric wire fixing part 14 in its longitudinal direction. This makes possible for a worker when attaching the clip 2 to the attaching hole of the panel, to press the pressed part 25 toward the attaching hole. Therefore, workability is improved of attaching the clip 2 to the attaching hole of the panel.

The restriction part 29 is disposed at one end of the tubular part 19, as well as continuous with an edge end of the second restriction part 11a of the main body 11. The restriction part 19 is columnar-shaped with nearly the same width as an outline of the tubular part 19. This makes the end of the aforementioned one protect tube 4b abut the restriction part 29 to restrict the protect tube 4b from entering into the tubular part 19.

The connection part 28 is disposed in a middle of the tubular part 19 as well as continuous with an upper face of the main body 11. The connection part 28 is disposed in a middle nearer than the engaging projection 21. The connection part 28 is disposed on an axis of an upstanding direction of the latch part 12.

This makes the end of the other protect tube 4a entering into the other side of the tubular part 19 abut the connection part 28, and restrict the other protect tube 4a from entering. Therefore, the other protect tube 4a is prevented from excessively entering into the other protect tube 19.

A mold molding the wire harness with clip 1 of the wire harness 8 configured such as aforementioned is provided with a cavity for electric wire formed along the outline of the electric wire 3, and a cavity for clip formed along the outline of the clip 2. The mold is made as horizontally dividable mold having good workability for worker such as to wire the electric wire 3 within the cavity for electric wire, or to eject the wire harness with clip 1 in which the clip 2 is molded integral with the electric wire 3. Note that as the mold vertically dividable mold may be employed.

Then, a method will be discussed for attaching the wire harness 8 configured such as aforementioned to the attaching hole of the panel of the automobile.

Firstly, so as to position the latch part 12 of the wire harness with clip 1 composing the wire harness 8 where it is latched into the attaching hole of the panel, the wire harness 8 is wired in the panel along a given formation, and the pressed part 25 is pressed toward the attaching hole. At this time, the latch part 12 is inserted into the attaching hole, and each free end of the latch part 17 is elastically deformed in such a direction as approaching to each other.

Then, insertion of the latch part 12 into the attaching hole makes each free end of the latch piece 17 displaced in a direction separating from each other by its elastic recovery force. The press part 13 presses the panel, as well as the engaging step at each free end of the latch part 17 engages with the periphery edge of the attaching hole so that the wire harness 8 is fixed to the panel.

According to the present embodiment, the sire harness with clip 1 is formed such that the clip 2 to be lathed into the attaching hole of the panel is molded integral with the electric wire 3, which the clip 2 is provided with the main body 11, the latch part 12 upstanding from the lower face of the main body 11 and latched into the attaching hole, and the electric wire fixing part 14 disposed on the upper face of the main body 11 as well as integrally molded on the outer periphery of the electric wire 3 to fix the electric wire 3, which the electric wire fixing part 14 is provided with the engaging projection 21 through which the electric wire 3 is passed and inserted into the engaging with the inner periphery of the protect tube 4 protecting the electric wire 3, and the restriction part 29 restricting the protect tube 4 from entering into the electric wire fixing part 14.

Since the wire harness with clip 1 is thereby provided with the attaching projection 21 engaging with the inner periphery of the protect tube 4, and the restriction part 29 restricting the protect part from entering in the electric wire fixing part 14, it is made possible to fix the protect tube 4 to the electric wire fixing part 14 as well, as restrict the protect tube 4 from entering into the electric wire fixing part 14. Therefore, it is made possible to eliminate work for winding tape for fixing the protect tube 4 onto the clip 2 as well as to restrict the protect tube 4 from entering.

Therefore, it is made possible to shorten time required for manufacturing the wire harness with clip as well as to reduce manufacturing cost of the wire harness with clip, and to prevent the protect tube and the latch part from interfering with each other resulting from the protect tube excessively entering.

According to the present embodiment, the wire harness with clip 1 is provided with the second restriction part 11a in the main body 11, restricting the protect tube 4 from entering into the electric wire fixing part 14.

Therefore, since the wire harness with clip 1 is provided with the second restriction part 11a in the main body 11, restricting the protect tube 4 from entering into the electric wire fixing part 14, it is made possible to restrict the protect tube 4 from entering into the electric wire fixing part 14 by the second restriction part 11a and the restriction part 29 of the electric wire fixing part 14 it is thereby possible to securely restrict the protect tube 4 from entering Thereby it is made possible to securely restrict the protect tube 4 from excessively entering so as to securely prevent the protect tube 4 and the latch part 12 from interfering with each other.

According to the present embodiment, the wire harness with clip 1 is provided with the second restriction part 11*a* at the one end of the main body 11 as well as the restriction part 29 continuous with the edge end of the second restriction part 11*a*.

Therefore, since the wire harness with clip 1 is provided with the second restriction part 11*a* at the one end of the main body 11 as well as the restriction part 29 continuous with the edge end of the second restriction part 11*a*, it is made possible to restrict the protect tube 4 from entering into the electric wire fixing part 14 at the one end of the main body 11. Therefore, it is made possible to make the restriction part 29 and the second restriction part 11*a* away from the latch part 12, further securely preventing the protect tube 4 and the latch part 12 from interfering with each other.

According to the present embodiment, the wire harness 8 is provided with the protect tube 4 and the connector 5 in the wire harness with clip 1, it is made possible to eliminate winding tape such as adherence tape for fixing the protect tube 4 to the clip 2. It is also made possible to shorten working time for manufacturing the wire harness 8 as well as reduce manufacturing cost therefor.

Since the wire harness with clip 1 is provided with the protect tube 4 and the connector 5 in the wire harness with clip 1, it is made possible to securely restrict the protect tube 4 from excessively entering by the restriction part 29 and the second restriction part 11*a*. And it is made possible to securely prevent the protect tube 4 and the latch part 12 from interfering with each other.

It is to be understood the aforementioned embodiment only shows what the present invention typically represents, but the present invention is not limited to the embodiment. Therefore, unless otherwise such changes and modifications depart from the scope of the present invention hereinafter defined, they should be construed as being included therein.

REFERENCE SINGS LIST

1 wire harness with clip
2 clip
3 electric wire
4 protect tube
5 connector
8 wire harness
11 main body
11*a* second restriction part
12 latch part
13 press part
14 electric wire fixing part
21 engaging projection
29 restriction part

The invention claimed is:

1. A wire harness with clip comprising:
a clip configured to be latched into an attaching hole of a panel, and molded integral with an electric wire, the clip including a main body, a latch part upstanding from a lower face of the main body and is latched into the attaching hole, and
an electric wire fixing part disposed on an upper face of the main body, integrally molded on an outer periphery of the electric wire so as to fix the electric wire, the electric wire fixing part including an engaging projection engaging with an inner periphery of a protect tube, the protect tube passing the electric wire therethrough and protecting the electric wire, a restriction part restricting the protect tube from entering into the electric wire fixing part.

2. The wire harness with clip as claimed in claim 1, wherein the electric wire fixing part is provided with a second restriction part restricting the protect tube from entering into the electric wire fixing part.

3. The wire harness with clip as claimed in claim 1, wherein the second restriction part is disposed at one end of the main body, and wherein the restriction part is arranged continuous with an edge end of the second restriction part.

4. The wire harness with clip as claimed in claim 2, wherein the second restriction part is disposed at one end of the main body, and wherein the restriction part is arranged continuous with an edge end of the second restriction part.

5. A wire harness, comprising:
a wire harness with clip, including
a connector disposed at, at least one end of an electric wire,
a protect tube passing the electric wire therethrough and protecting the electric wire, and
a clip configured to be latched into an attaching hole of a panel, and molded integral with the electric wire, wherein the wire harness with clip is that claimed in claim 1.

6. A wire harness, comprising:
a wire harness with clip, including a connector disposed at, at least one end of an electric wire, a protect tube passing the electric wire therethrough and protecting the electric wire, and
a clip configured to be latched into an attaching hole of a panel, and molded integral with the electric wire, wherein the wire harness with clip is that claimed in claim 2.

7. A wire harness, comprising:
a wire harness with clip, including
a connector disposed at, at least one end of an electric wire,
a protect tube passing the electric wire therethrough and protecting the electric wire, and
a clip configured to be latched into an attaching hole of a panel, and molded integral with the electric wire, wherein the wire harness with clip is that claimed in claim 3.

* * * * *